United States Patent Office 3,167,585
Patented Jan. 26, 1965

3,167,585
PROCESS FOR CARBOXYLATION OF
ISO-OLEFINS
John E. Anderson, Glenshaw, and Norman W. Franke,
Penn Hills Township, Allegheny County, Pa., assignors
to Gulf Research & Development Company, Pittsburgh,
Pa., a corporation of Delaware
No Drawing. Filed Aug. 25, 1960, Ser. No. 51,787
6 Claims. (Cl. 260—533)

This invention relates to a process for preparing organic acids and more particularly to a process for preparing organic acids by reaction of an olefin, said olefin being one which gives tertiary carbonium ions upon proton addition, with carbon monoxide and water.

We have found that optimum amounts of organic acids are formed in the process wherein an olefin which gives tertiary carbonium ions upon proton addition is reacted with carbon monoxide and water when said olefin and carbon monoxide are reacted in the liquid phase in the presence of sulfuric acid having a concentration of about 82 to about 88 and the reaction product so produced is thereafter taken up with water.

Olefins which give tertiary carbonium ions upon proton addition and which can be employed in the practice of this invention can be defined by the following structural formula:

$$R_1-\overset{R_2}{\underset{}{C}}=\overset{R_3}{\underset{}{C}}-R_4$$

wherein $R_1$ and $R_2$, the same or different, can be alkyl radicals having from one to 20 carbon atoms, preferably from one to 15 carbon atoms, such as methyl, ethyl, propyl, n-butyl, isobutyl, tert-butyl, pentyl, neopentyl, methylbutyl, decyl, eicosyl, ethylmethylpentadecyl, etc.; and $R_3$ and $R_4$ can be hydrogen or similar to $R_1$ or $R_2$ above. Examples of olefins which can thus be employed are isobutylene, 2-methylbutene-1, 2-methylbutene-2, 2,4-dimethylpentene-2, 2,4,4-trimethylpentene-1, 2,2,4-trimethylpentene-2, 2-methylpentadecene-2, etc.

The reaction requires approximately equal molar amounts of each of the reactants, carbon monoxide, water and olefin, and sulfuric acid. Desirably, it is preferred that the molar ratio of sulfuric acid to olefin be at least about three to one. Using the preferred ratios we obtain less polymerization of olefin under the reaction conditions.

The sequence in which the reactants and catalyst are brought together is of utmost importance. Sulfuric acid and carbon monoxide, separately or together, are introduced into the reaction zone. Only after the catalyst and reaction zone have been saturated with carbon monoxide is the addition of the defined olefin made. This is done primarily to reduce or inhibit olefin polymerization in the presence of sulfuric acid. Water is then added to the reaction product obtained from the reaction of carbon monoxide and sulfuric acid with olefin. The desired organic acid is thereafter recovered from the final reaction product.

We have found that in order to obtain optimum yields of organic acids in the above process when the olefin employed is one which will give tertiary carbonium ions upon proton addition it is absolutely imperative that the concentration of the sulfuric acid be between about 82 to about 88 percent, preferably between about 83 to about 86 percent.

Carbon monoxide is added to the reaction zone at the beginning of the reaction and by periodic addition or any other suitable means as required during the course of the reaction to maintain the desired concentration of the same as well as the desired reaction pressure. The reaction of carbon monoxide and sulfuric acid with olefin is extremely fast. Thus we have found that when 1.5 mols of olefin were added at the rate of one milliliter per minute to an autoclave containing 4.5 mols of $H_2SO_4$ having a concentration of 85 under a carbon monoxide pressure of 1000 pounds per square inch gauge, the reaction was completed in four hours without undue polymerization. Under reaction conditions employed, care must be exercised to have only sufficient olefin present to facilitate the desired reaction and not such an excess that will promote the polymerization thereof. The amount of olefin introduced therein must, therefore, correspond approximately to the amount of olefin reacted.

The temperature and pressure required for the reaction of carbon monoxide and sulfuric acid with olefin are moderate. Thus the temperature can be about $-20°$ to about $70°$ C., preferably about $0°$ to about $50°$ C. and the pressure in excess of about 100, preferably about 800 to about 2000 pounds per square inch gauge.

At least one mol of water must be added to the reaction product for each mol of olefin which has reacted in the desired reaction. The temperature employed in this phase of the reaction can be amout $-10°$ to about $60°$ C. and the pressure about one-half to about 10 atmospheres.

The reaction product obtained upon the addition of water contains the desired organic acid along with some minor amounts of alcohol, esters and polyolefins. If the organic acid has four to six carbon atoms it will be completely soluble in the sulfuric acid associated therewith. One having seven to ten carbon atoms will be extremely soluble in the sulfuric acid. If the organic acid has from 11 to 15 carbon atoms it will be slightly soluble in the sulfuric acid, while one having 16 or more carbon atoms will be insoluble therein.

Thus the separation of the desired organic acid from the sulfuric acid and other constituents associated therewith will depend upon its solubility in the sulfuric acid. With an organic acid having four to six carbon atoms, the mixture is diluted further with water. The solubility of the organic acid in dilute sulfuric acid being small, ordinary decantation is satisfactory. Organic acids having from seven to 10 carbon atoms can be extracted with a saturated hydrocarbon such as hexanes, pure or mixed pentanes, heptanes, etc. The organic acid is then separated from the saturated hydrocarbon by distillation. Since organic acids having 11 or more carbon atoms are slightly soluble or insoluble in sulfuric acid, ordinary separation such as decantation is satisfactory. The sulfuric acid can be recovered and reused.

The mechanism of the reaction is believed to be as follows, using isobutylene as the representative olefin:

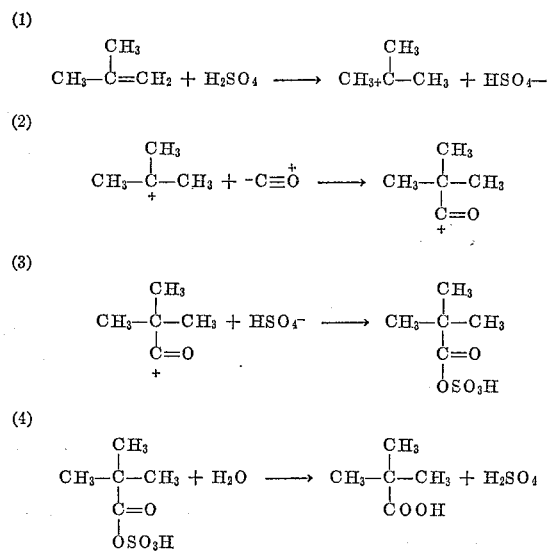

The process of this invention can better be understood by reference to the following examples. In Example I below the process is illustrated using sulfuric acid of various concentrations and diisobutylene feed (about 80 percent by weight of which was 2,4,4-trimethyl pentene-1 and 20 percent by weight 2,4,4-trimethyl pentene-2).

EXAMPLE I

In each run 4½ mols of the sulfuric acid was placed in a container and sufficient carbon monoxide (about 100 percent carbon monoxide) was introduced therein to saturate the sulfuric acid, obtain a carbon monoxide atmosphere and a pressure of 1000 pounds per square inch gauge. Periodically during the reaction carbon monoxide was introduced therein to maintain a constant pressure of 1000 pounds per square inch gauge. In each run after the desired pressure was obtained the olefin was introduced therein at the rate of one milliliter per minute until 1.5 mols of olefin had been introduced. The temperature during the reaction was maintained at 20° C.

When the reaction was complete the container was depressured and drained. Sufficient water was then added to the container to dilute the acid to a concentration of 75 percent. This resulted in an almost complete separation of organic product from the sulfuric acid. The sulfuric acid layer, after decantation, was extracted with 500 milliliters of n-hexane to recover contained organic acids. The organic product was stirred into 600 grams of a 10 percent by weight of sodium hydroxide solution, and this basic mixture was shaken in a separatory funnel with the aforementioned hexane extract to recover any organic acid acid in the extract. The organic acids are more soluble in a basic solution and, consequently, were removed from the n-hexane phase.

The basic layer containing the organic acids was seprated from the n-hexane layer by decantation. Then the basic layer was placed into a vessel provided with means for cooling. Sufficient amount of hydrochloric acid (about 20 percent by weight hydrochloric acid) was added with cooling until the pH of the solution was about 2 and the organic acid layered out from the basic solution.

To improve this separation, the entire organic layer was placed into another separatory funnel and 250 milliliters of n-hexane was added. In this acidic medium and with proper shaking, the organic acid dissolved into the n-hexane layer. About 300 milliliters of water was added to wash out any traces of the mineral acid (hydrochloric acid). The hexane layer was then recovered by decantation. It was passed over Drierite (anhydrous calcium sulfate) to remove any absorbed water and distilled at atmospheric pressure to recover the n-hexane which could be reused. The remaining bottom from this distillation was vacuum distilled at 10 mm. of mercury to recover the carboxylic acid.

Table I

| Run No. | Sulfuric Acid Concentration, Percent by Wt. | Wt. of CO Absorbed, Gms. | Isononanoic Acid Recovered, Percent by Wt. |
|---|---|---|---|
| 1 | 78.2 | 14.5 | 49 |
| 2 | 80.0 | 24.9 | 75 |
| 3 | 82.8 | 34.3 | 92 |
| 4 | 85.0 | 38.7 | 96 |
| 5 | 87.0 | 38.4 | 97 |
| 6 | 88.7 | 36.2 | 93 |
| 7 | 90.0 | 38.7 | 93 |
| 8 | 96.9 | 26.9 | 40 |

EXAMPLE II

In this example the runs were made in a manner identical to those of Example I, except that the olefin employed was isobutylene. The results of the runs are summarized below in Table II.

Table II

| Run No. | Sulfuric Acid Concentration, Percent by Wt. | Wt. of CO Absorbed, Gms. | Pivalic Acid Recovered, Percent by Wt. |
|---|---|---|---|
| 9 | 79.3 | 4 | 37.3 |
| 10 | 82.6 | 25 | 90.3 |
| 11 | 85.5 | 27 | 110.5 |
| 12 | 87.7 | 24 | 96.0 |
| 13 | 89.8 | 22 | 90.5 |
| 14 | 92.6 | 27 | 87.9 |
| 15 | 96.0 | 18 | 88.8 |

In each of the runs reported in Tables I and II the weight of carbon monoxide absorbed was determined from the increased weight of the initial product mixture over that of sulfuric acid plus olefin charge. The amount of organic acid recovered is based on the weight of the olefin charge. From the data above it is apparent that optimum amounts of organic acids are obtained when the concentration of the sulfuric acid employed initially is from about 82 to about 88 percent, preferably from about 83 to about 86 percent. While in the case of Runs 6 and 7 it would appear that no real significance exists between the use of sulfuric acid having a concentration of 88.7 and 90 percent insofar as the amount of organic acid recovered, it is apparent that no real purpose is served, however, by using the higher concentration if the lower will produce the same results. Yet it will be noted that in Run 6 less carbon monoxide was absorbed than in Run 7, even though additional organic acid was not recovered in Run 7. It was noted, however, that the distillation residue in Run 7 was greater than in Run 6, indicating formation of additional undesirable products with the sulfuric acid having the higher concentration.

That the sulfuric acid concentration defined herein is critical only when the olefin employed is one which will give a tertiary carbonium ion upon proton addition is apparent from Example III below.

EXAMPLE III

In the runs summarized below in Table II the procedure employed was identical to the procedures of Examples I and II, the only difference being that octene-1 was employed as the charge olefin.

Table III

| Run No. | Sulfuric Acid Concentration, Percent by Wt. | Wt. of CO Absorbed, Gms. | Nonanoic Acid Recovered, Percent by Wt. |
|---|---|---|---|
| 16 | 96.0 | 37.2 | 119 |
| 17 | 88.8 | 9.1 | 22 |

From Runs 16 and 17 it can be seen that with a straight chain olefin the use of sulfuric acid of concentration sufficient to produce excellent results with the olefins employed in the instant process is ineffective. In such case sulfuric acid having a concentration appreciably higher than that employed herein is satisfactory.

Obviously many modifications and variations of the invention as hereinabove set forth can be made without departing from the spirit and scope thereof, and only such limitations should be imposed as are indicated in the appended claims.

We claim:
1. A process for producing organic carboxylic acids which comprises adding an olefin which gives tertiary carbonium ions upon proton addition, said olefin being defined by the following structural formula:

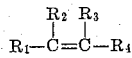

wherein $R_1$ and $R_2$ are alkyl radicals $R_3$ and $R_4$ are selected from the group consisting of alkyl radicals and hydrogen, the total number of carbon atoms in said olefin being from four to 16 carbon atoms, to a reaction zone containing carbon monoxide and sulfuric acid having a concentration of 82 to 88 percent and thereafter adding water to the reaction product so produced to obtain an organic acid.

2. A process for producing organic carboxylic acids which comprises adding an olefin which gives tertiary carbonium ions upon proton addition, said olefin being defined by the following structural formula:

$$R_1-\overset{R_2}{\underset{}{C}}=\overset{R_3}{\underset{}{C}}-R_4$$

wherein $R_1$ and $R_2$ are alkyl radicals and $R_3$ and $R_4$ are selected from the group consisting of alkyl radicals and hydrogen, the total number of carbon atoms in said olefin being from four to eight carbon atoms, to a reaction zone containing carbon monoxide and sulfuric acid having a concentration of 82 to 88 percent and thereafter adding water to the reaction product so produced to obtain an organic acid.

3. A process for producing organic carboxylic acids which comprises adding an olefin which gives tertiary carbonium ions upon proton addition, said olefin being defined by the following structural formula:

$$R_1-\overset{R_2}{\underset{}{C}}=\overset{R_3}{\underset{}{C}}-R_4$$

wherein $R_1$ and $R_2$ are alkyl radicals and $R_3$ and $R_4$ are selected from the group consisting of alkyl radicals and hydrogen, the total number of carbon atoms in said olefin being from four to 16 carbon atoms, to a reaction zone containing carbon monoxide and sulfuric acid having a concentration of 82 to 88 percent at a temperature of about $-20°$ C. to about $70°$ C. and thereafter adding water to the reaction product so produced to obtain an organic acid.

4. A process for producing organic carboxylic acids which comprises adding an olefin which gives tertiary carbonium ions upon proton addition, said olefin being defined by the following structural formula:

$$R_1-\overset{R_2}{\underset{}{C}}=\overset{R_3}{\underset{}{C}}-R_4$$

wherein $R_1$ and $R_2$ are alkyl radicals $R_3$ and $R_4$ are selected from the group consisting of alkyl radicals and hydrogen, the total number of carbon atoms in said olefin being from four to eight carbon atoms, to a reaction zone containing carbon monoxide and sulfuric acid having a concentration of 82 to 88 percent at a temperature of about $-20°$ C. to about $70°$ C. and thereafter adding water to the reaction product so produced to obtain an organic acid.

5. A process for producing pivalic acid which comprises adding isobutylene to a reaction zone containing carbon monoxide and sulfuric acid having a concentration of 82 to 88 percent and thereafter adding water to the reaction product so produced to obtain an organic acid.

6. A process for producing isononanoic acid which comprises adding diisobutylene to a reaction zone containing carbon monoxide and sulfuric acid having a concentration of 82 to 88 percent and thereafter adding water to the reaction product so produced to obtain an organic acid.

References Cited by the Examiner
UNITED STATES PATENTS

| | | | |
|---|---|---|---|
| 2,419,131 | 4/47 | Ford | 260—533 |
| 2,831,877 | 4/58 | Koch | 260—413 |
| 3,053,869 | 9/62 | McAlister et al. | 260—413 |

CHARLES B. PARKER, Primary Examiner.

A. H. WINKELSTEIN, Examiner.